(12) United States Patent
Smith et al.

(10) Patent No.: US 7,368,159 B2
(45) Date of Patent: May 6, 2008

(54) REINFORCING STRIPS FOR CORRUGATED PAPERBOARD AND RELATED METHOD AND APPARATUS FOR ITS MANUFACTURE

(75) Inventors: Curtis Smith, Spartanburg, SC (US); Ronald Schaffer, Spartanburg, SC (US); Michael Jackson, Beaufort, SC (US); Edward E. Balder, Savannah, GA (US); George D'Urso, Loveland, OH (US)

(73) Assignee: International Paper Company, Memphis, TN (US)

( * ) Notice: Subject to any disclaimer, the term of this patent is extended or adjusted under 35 U.S.C. 154(b) by 187 days.

(21) Appl. No.: 09/948,382

(22) Filed: Sep. 6, 2001

(65) Prior Publication Data

US 2002/0071937 A1  Jun. 13, 2002

(Under 37 CFR 1.47)

Related U.S. Application Data (60) Provisional application No. 60/230,671, filed on Sep. 7, 2000.

(51) Int. Cl.
*B32B 3/28* (2006.01)
*B32B 3/14* (2006.01)

(52) U.S. Cl. .......................................... 428/182; 428/78
(58) Field of Classification Search ................. 428/182, 428/184, 43, 77, 78
See application file for complete search history.

(56) References Cited

U.S. PATENT DOCUMENTS

| | | | | |
|---|---|---|---|---|
| 3,307,994 A | * | 3/1967 | Scott | 428/182 |
| 3,346,105 A | * | 10/1967 | Nye et al. | 428/182 |
| 3,406,052 A | | 10/1968 | Peters | |
| 3,411,689 A | | 11/1968 | Brackett | |
| 3,796,307 A | | 3/1974 | McKinney | |
| 4,095,692 A | | 6/1978 | Shelton | |
| 4,177,895 A | | 12/1979 | Shelton | |
| 4,339,292 A | * | 7/1982 | Itoh et al. | 156/206 |
| 4,398,650 A | | 8/1983 | Holmes et al. | |
| 4,437,850 A | | 3/1984 | Ono | |
| 4,936,451 A | | 6/1990 | Shuert | |
| 5,285,957 A | | 2/1994 | Halsell | |
| 5,496,617 A | * | 3/1996 | Bullock | 428/182 |

FOREIGN PATENT DOCUMENTS

CA  889808  1/1972

\* cited by examiner

*Primary Examiner*—Donald J. Loney
(74) *Attorney, Agent, or Firm*—Thomas W. Barnes, III; Dennis H. Lambert; Dara L. Onofrio, Esq.

(57) ABSTRACT

Reinforcing packaging strips comprised of low melt point, low density polyethylene coated on at least one surface of a substrate. Corrugated paperboard packaging comprising a fluted paperboard medium having in selected areas a reinforcing liner, wherein said reinforcing liner has an adhesive surface which when heat activated adheres to the medium surface. The resulting structure has high strength and tear resistance in designated areas.

11 Claims, 6 Drawing Sheets

REINFORCING STRIPS FOR CORRUGATED PAPERBOARD AND RELATED METHOD AND APPARATUS FOR ITS MANUFACTURE

This application claims the benefit of U.S. provisional application No. 60/230,671 filed Sep. 7, 2000, which is incorporated herein by reference.

FIELD OF THE INVENTION

The present invention relates to the field of packaging, specifically corrugated paperboard packaging. In particular the invention provides reinforcing strips for corrugated paperboard structures and the related method and apparatus for manufacture.

BACKGROUND OF THE INVENTION

Corrugated paperboard is currently used in countless packaging applications and is, by far, the most popular packaging for articles or materials suitable for packaging in boxes, whether for shipment, storage or both. Because of commercial value, the conventional corrugated paperboard container has been the focus of extensive research and development resulting in continuous improvements therein. Of late, much effort has been put into developing containers with improved stacking strength as well as deriving more strength from less fiber mass.

Of particular interest herein is the fact that loads and stresses placed on corrugated packages are rarely distributed uniformly. This can be due to many different reasons; uneven weight distribution of package contents, shape of package contents, handling (or mishandling), etc. Whatever the cause, the result is often loads and stresses that are highly concentrated or localized. Industry has sometimes addressed this issue by improving package design, often times quite creatively. However, good design and engineering practices dictate that a package be manufactured to perform in a "worst case" scenario, so the inevitable result is a package which meets the stringent performance requirements of certain areas while providing excessive packaging in others. Importantly, this results in a package that is not as economical or cost effective as it could be.

For example, one of the most critical performance criteria for many corrugated paperboard boxes is stacking strength. Box designers typically increase stacking strength by increasing the weight of the liners and/or medium. This provides the added stacking strength needed in the walls of the box, but also provides additional strength (and fiber mass) in the top and bottom of the box where it is not needed, unnecessarily increasing cost.

Another example involves packages that need to be bulge and/or burst resistant due to outward force applied by the package contents, often a fluid material. Like the stacking strength example supra, a common remedy to this problem is simply making a box out of heavier components. This remedy may solve the problem, but is uneconomical. A common post-manufacturing remedy to this problem consists of simply applying a reinforcing tape, such as a nylon mesh reinforcing tape, to the external surface of a package. This remedy is cumbersome, costly due to the labor involved, often provides sub-optimum performance, typically not an option if aesthetics are an issue, and adds little to prevent package deformation. Methods are available wherein a reinforcing mesh and or strands are included between the medium and outside liner, but these remedies provide reinforcement to the entire package including areas where reinforcement is unnecessary.

Yet another example involves packages which include closure flaps that are subject to repeated opening and closing. These packages often fail at the closure scoreline. A common remedy is to apply reinforcing tape along the scoreline. As with the bulge resistant example above, this remedy is cumbersome, costly due to the labor involved, often provides sub-optimum performance, and is typically not an option if aesthetics are an issue.

A final example involves large appliances packaged in regular slotted containers with a basiloid flap at the upper end. In this application, lift trucks fixed with a flat, laterally situated lifting hook, lift and move these loaded containers by inserting the flat hook into the space between the container sidewall and basiloid flap then lifting the entire package by the flap. This method of transport places highly localized loads on the basiloid flap/joint area and has resulted in failure within the joint, specifically along lateral scorelines. This problem has been remedied by either applying reinforcing tape around the joint area or increasing the basis weight of the components in the container. The former requires additional labor and provides sub-optimum performance, while the latter unacceptably increases packaging costs.

Many technologies and methods are known that enable the manufacture of reinforced packages, specifically reinforced corrugated paperboard packages, but each have limitations which fall short of the benefits provided by this invention.

U.S. Pat. No. 4,398,650 to Holmes et. al. discloses a corrugated container wherein a plurality of reinforcing strands are contained between the medium and outside liner. The enhancement provided by this method is limited to bulge and burst resistance. It adds little in terms of stacking strength, rigidity or scoreline integrity.

U.S. Pat. No. 5,285,957 to Halsell discloses a reinforced corrugated container wherein a reinforcing mesh composed of natural cellulosic strands is contained between the medium and outside liner. As with the Holmes patent listed above, the enhancement provided by this disclosure is limited to bulge and burst resistance. This method provides no additional stacking strength, rigidity or scoreline integrity, and is not selectively applied.

U.S. Pat. No. 4,437,850 to Ono discloses a process of manufacturing reinforced corrugated cardboard type containers wherein a reinforcing agent is applied along longitudinal scorelines between the outside liner and medium. In this disclosure, the lines of reinforcing agent are located such that they cover the areas that are scored and ultimately become the upper and lower horizontal perimeter of a finished box. As disclosed, this method enhances stacking strength by minimizing crush failure in the vicinity of the treated scorlines, but adds no stacking strength to the walls or additional resistance to bulge or burst. Most importantly, this method requires that scoring, folding and forming occur before the reinforcing agent hardens.

U.S. Pat. No. 3,411,689 to Brackett discloses placing narrow strips of thermoplastic material into corrugated board flutes at intervals and before the corrugated medium is attached to a second liner.

U.S. Pat. No. 3,796,307 to McKinney discloses a heat shrinkable polymeric film attached to corrugated fluting, the resulting product is formed into a carton or bundled package and then the entire package is heated to shrink the polymeric film.

U.S. Pat. No. 4,936,451 to Shuert is directed to a container comprised of a sleeve and end unit. The sleeve is made of corrugated material and contains a plurality of slots which interlock with latches on the end unit.

Canadian Pat. No. 889808 to Karass discloses a "weftless" tape or strap product. The tape is comprised of threads of synthetic resin, including polyethylene. An adhesive is then applied to the threads.

U.S. Pat. No. 3,406,052 to Mendham is directed to waterproof containers that maintain strength. This is accomplished by passing corrugated fiberboards through heat-softened films of thermoplastic material (including polyethylene) and then applying a certain amount of pressure to adhere the films to the faces of the fiberboard. The edges of the coated fiberboards are crushed and then sealed with a waterproof substance.

U.S. Pat. Nos. 4,095,692 and 4,177,895 both to Shelton are directed to a container having walls laminated with polymeric film, including polyethylene. The purpose of the lamination or "shroud' of polymeric film is to prevent air current from passing through the interior of the container.

The present invention is an improvement over prior art processes by providing reinforcing packaging strips to strengthen the load-carrying joints in corrugated packaging by selectively applying the strips to desired areas. Further, in addition to increasing strength, the strips provide more tear resistance to the reinforced joint and stiffen the entire flap, enabling it to carry a heavier load without failing.

Typically, corrugated paperboard is manufactured such that the finished product includes two opposed liners, a fluted medium disposed in between with adhesive forming permanent bonds between the flute tips and the opposed liners. Corrugated paperboard that includes two liners about one medium is typically called single wall. The term double wall typically describes three liners and two mediums in alternating layers, while triple wall refers to alternating layers including four liners and three mediums.

In general, to manufacture single wall corrugated paperboard, three substrates are used, a singleface liner, a doubleface liner, and a corrugating medium, and several manufacturing steps are followed. First, a continuous web of corrugating medium is directed between two corrugating rolls that form the medium into a corrugated web with lateral flutes. Next, the fluted medium is directed against a glue-bearing cylinder that places a metered amount of adhesive on each flute tip of one side.

The medium is then directed against a continuous web of singleface liner such that the glue-bearing flute tips bond evenly to the liner to form a substrate commonly called singleface-corrugated paperboard. The singleface-corrugated paperboard is then directed against a second glue-bearing roll that places a metered amount of adhesive on the flute tips located opposite the singleface liner which is then directed against a continuous web of double-face liner such that the glue-bearing flute tips bond evenly to the doubleface liner to form single wall corrugated paperboard (commonly referred to as combined board).

The next step in the manufacturing process involves moving the web of combined board through a controlled hot plate section in order to heat and cure the adhesive. Upon exiting the hot plate section, the web travels through a cooling section wherein ambient air cools the paperboard and adhesive. The web is then directed through a slitter/knife section wherein the combined board is continuously slit longitudinally, then laterally cut into sheets suitable for converting into boxes or other finished containers. Double and triple wall combinations are manufactured in the same general way except that two or three layers of single-face corrugated are directed together along with a doubleface liner. The steps involved in manufacturing corrugated paperboard are highly standardized throughout the packaging industry and well known within the art. However, these known processes are not entirely satisfactory in certain applications such as in strengthening load-carrying joints in corrugated packaging and enhancing tear resistance to movable joints in corrugated packaging.

The invention disclosed herein addresses the problems discussed above and the shortcomings of currently available remedies. A general object of the present invention is to provide reinforcing strips made of a paper substrate coated on one side with low melt, low density polyethylene for application to selected portions of corrugated paperboard structures.

Another object of the invention is to provide a method for manufacturing reinforced corrugated paperboard packaging that is more economical over the prior art method of reinforcing which uses nylon-based tape.

A further object of the invention is to provide a method for manufacturing reinforced corrugated paperboard packaging wherein reinforcement can easily be applied only to select areas.

A specific object of the invention is to provide an apparatus for manufacturing selectively reinforced corrugated paperboard.

Another specific object of the invention is to provide a method for manufacturing selectively reinforced corrugated paperboard that is compatible with existing manufacturing equipment and requires no modification of major equipment.

Another object of the invention is to provide a method for manufacturing selectively reinforced corrugated paperboard that utilizes a heat-activated adhesive that is activated by ambient heat present in a conventional hot plate section.

A further object of the invention is to provide a method for manufacturing selectively reinforced corrugated paperboard that remains formable and pliable after manufacturing.

Another further object of the invention is to provide a stronger corrugated box structure by stiffening the folding flap with reinforcing strips.

SUMMARY OF THE INVENTION

In the present invention, these purposes, as well as others which will be apparent, are achieved generally by reinforcing packaging strips comprised of low melt, low density polyethylene coated on a paper substrate and the related method and apparatus for producing such. These reinforcing strips are used in the manufacture of corrugated paperboard structures to strengthen the load-carrying joints in the resulting structure and to provide tear resistance to the reinforced joint. These strips, selectively placed on the structure, also reinforce flaps that are subject to repeated folding as well as stiffen the entire flap and body of the structure enabling it to carry a heavier load without failing. These strips are a significant improvement over the nylon mesh reinforced tape of the prior art and provide the resulting paperboard structure with good stacking, uniform distribution of loads and stress and bulge and/or burst resistant properties.

In a preferred embodiment, the polyethylene coated strip is placed so that it reinforces the score on the corrugated board that eventually forms the joint at the top of the box, thus selectively reinforcing the closure scoreline to permit repeated opening and closing without failure.

Other objects, features and advantages of the present invention will be apparent when the detailed description of the preferred embodiment of the invention are considered with reference to the drawings which should be construed in an illustrative and not limiting sense as follows:

DETAILED DESCRIPTION OF THE PREFERRED EMBODIMENT

In accordance with the invention, reinforcing packaging strips comprised of a heat activated adhesive, preferably a low melt point, low density polyethylene, coated on at least one surface of a paper substrate are provided. In alternate embodiments, both sides of the paper substrate may be coated with the heat activated adhesive.

Also provided is a reinforced corrugated paperboard substrate suitable for the manufacture of packaging, comprising a top paperboard liner including a top and bottom surface; a fluted paperboard medium including a top and bottom surface, wherein the flute tips of the top surface of said medium are adhered to the bottom surface of said top liner; a reinforcing liner including a top and bottom surface, wherein the top surface of said reinforcing liner is adhered to the bottom flute tips of said medium, said reinforcing liner having a width less than the width of said medium; an adhesive covering the bottom surface of said reinforcing liner; and a bottom paperboard liner including a top surface and a bottom surface, the top surface of said bottom liner being adhered to the bottom surface of said reinforcing liner by means of said adhesive therebetween.

The adhesive is a heat activated compound activated by ambient heat present in the hot plate section of the corrugator. Preferably, the heat-activated adhesive is a thermoplastic material with a melting point below 250° F. The term "thermoplastic" as used herein refers to plastic materials, known to one of ordinary skill in the art, which are fusible and rendered soft and moldable by heat. Most preferable the thermoplastic material used in the invention is a low-density polyethylene resin. Typically, the low-density polyethylene resin has a coating weight in the range of 5.0–20.0 lbs./3000 sq. ft. and a density in the range of 0.90–1.00 g./cm$^3$.

In alternate embodiments the heat-activated adhesive is a thermosetting material with a melting point below 250° F. The term "thermosetting" as used herein refers to plastic materials, known to one of ordinary skill in the art, that are rendered hard by heat.

The invention also provides a method of manufacturing reinforced corrugated paperboard comprising the steps of (i) providing a continuous web of corrugated paperboard; (ii) feeding a reinforcing liner comprising a heat activated adhesive coated on at least one surface of a paper substrate over selective areas of said corrugated paperboard to form a laminated structure; (iii) heating said laminated structure to a temperature high enough to melt said heat activated adhesive causing said liner to adhere to the corrugated paperboard in the selected areas.

The invention also provides an apparatus for manufacturing reinforced corrugated paperboard comprising (i) first supply means for providing a continuous web of corrugated paperboard; (ii) second supply means for providing a reinforcing liner having an adhesive coating on at least one surface; (iii) placement means for placing said reinforcing liner on selective areas of said corrugated paperboard; and (iv) means for adhering said liner to said selective areas of the paperboard. In a preferred embodiment of the apparatus the means is a hot plate.

Figure 1:
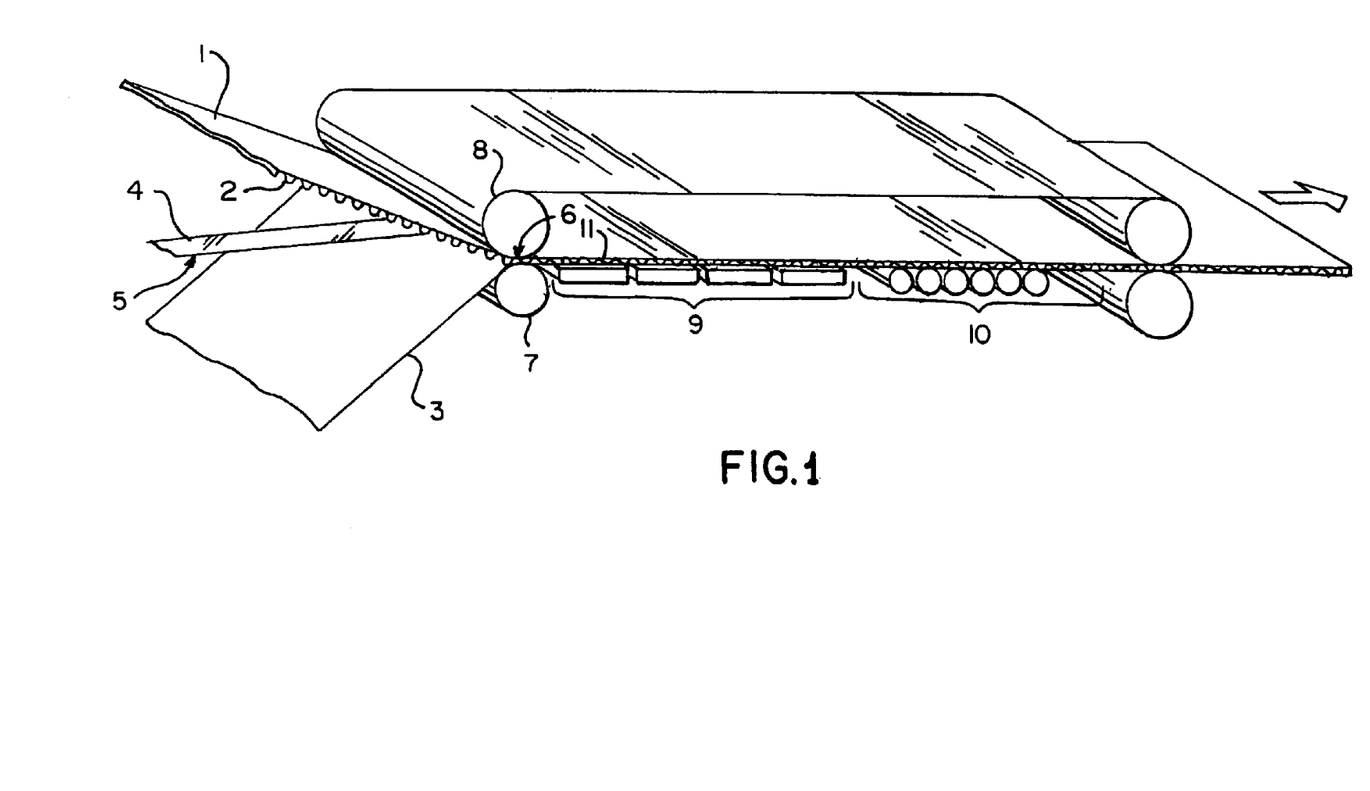
FIG. 1 is a perspective view of a web of singleface corrugated paperboard, bottom liner, and reinforcing liner as it is combined prior to entering the hot plate section of a typical corrugator.

The details of the invention are further illustrated by reference to the drawings. In particular, FIG. 1 illustrates the doublebacker nip, hotplate, and cooling sections of a conventional corrugator. The manufacturing process prior to this point is highly standardized throughout the industry, is well known within the art. A web of singleface corrugated paperboard, comprised of singleface liner 1 and corrugated medium 2, enter the doublebacker nip 6 of a conventional corrugator. The flute tips of medium 2 each carry a metered amount of adhesive that spans the entire web of each flute. A continuous web of doubleface liner 3 simultaneously enters the nip where it is pressed into contact with the flute tips of corrugated medium 2 at nip point 6 located between pressure roll 7 and hotplate belt drive roll 8. The pressure at nip point 6 is adjustable.

The invention process provides a continuous web of reinforcing liner 4 pre-coated on the bottom side with heat activated adhesive 5 is correspondingly fed into the nip point between the singleface and doubleface webs. The lateral placement and width of reinforcing liner 4 is adjustable. The lineal velocities of the three webs entering the nip point are controlled to be equal. After passing through nip point 6, the combined board 11, comprised of single face liner 1, corrugated medium 2, doubleface liner 3, reinforcing liner 4, and heat activated adhesive 5, then enters the hot plate section 9 wherein it slides across the top surface of each of a series of hot plates. The number of plates in a hot plate section is typically machine specific. The temperature of each hot plate is controlled, and the surface temperature is typically held between 290–350° F. As the combined board passes through the hot plate section, ambient heat activates adhesive 5 causing it to melt. Upon exiting the hot plate section, the combined board 11 passes through a cooling section wherein the temperature of adhesive 5 falls below melting point, allowing adhesive 5 to solidify and form an adhesive bond between doubleface liner 3 and reinforcing liner 4. After exiting the cooling section 10, combined board 11 is longitudinally slit and or scored, then laterally cut into sheets of various sizes. In separate manufacturing operations, said sheets are then cut and scored to form blanks which are then folded and/or glued into finished containers.

Figure 2A:
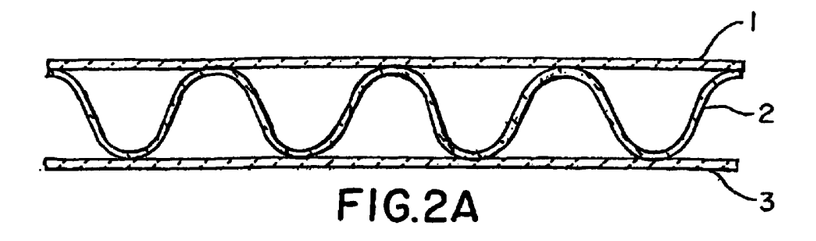
FIG. 2A is a longitudinal cutaway view of conventional finished single wall corrugated paperboard.
Figure 2B:
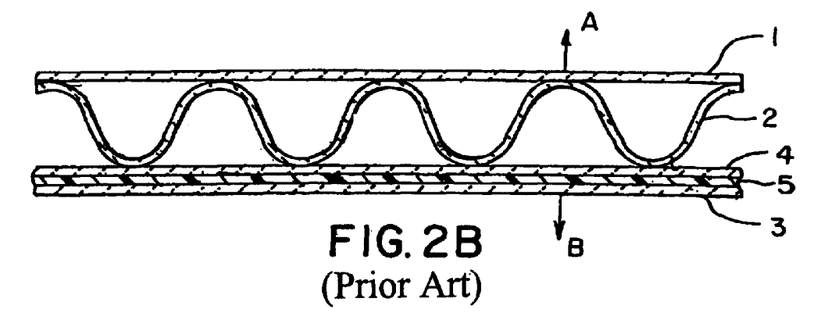
FIG. 2B is a longitudinal cutaway view of finished single wall corrugated paperboard including a reinforcing liner.

FIG. 2A shows a longitudinal cutaway of a conventional finished piece of single wall corrugated paperboard comprised of singleface liner 1, corrugated medium 2, and doubleface liner 3. The flute tips are bonded to each liner by means of a starch-based adhesive. The manufacturing process involved in making the "typical" combined board of FIG. 2A is well known within the art. FIG. 2B shows a longitudinal cutaway of a finished piece of reinforced single wall corrugated paperboard according to the invention comprised of singleface liner 1, corrugated medium 2, reinforcing liner 4, heat activated adhesive 5, and doubleface liner 3. Heat activated adhesive 5 forms a continuous bond between the entire surface of reinforcing liner 4 and corresponding surface of doubleface liner 3. Under normal operating conditions, the bond formed by heat activated adhesive 5 is stronger than the starch bond between either singleface liner 1 and medium 2 or reinforcing liner 4 and medium 2 such that the overall resistance of the structure to separating under opposed forces (indicated by force vectors A and B) is not diminished.

In a preferred embodiment, heat activated adhesive 5 is a low melting point, low density polyethylene resin applied to the bottom surface of reinforcing liner 4 by means of extrusion coating processes wherein a machine width web of liner is coated, then slit down to the desired width. Field tests show that polyethylene resins with densities in the range of 0.915–1.000 g/cm$^3$, melting points in the range of 220–225° F., melt indices in the range of 8.5–12.0 g/10 min., and coating weights up to 20 lbs./3000 sq. ft. meet performance criteria. Extrusion coating and slitting processes are well known within the art and common to the industry.

Figure 3A:
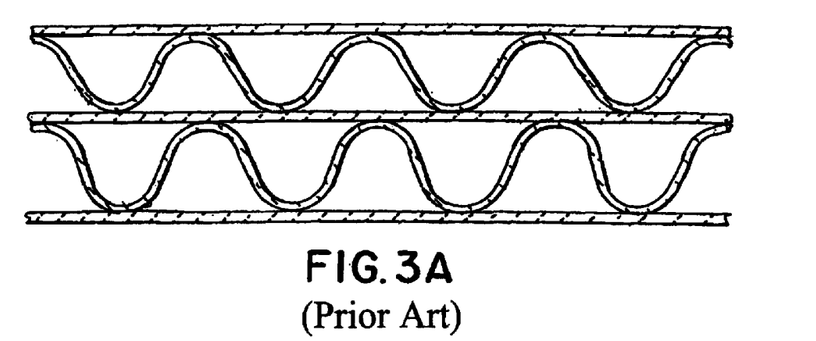
FIG. 3A is a longitudinal cutaway view of finished double wall corrugated paperboard.
Figure 3B:
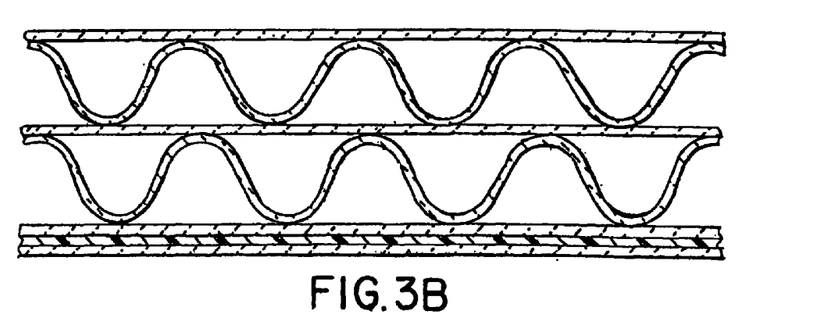
FIG. 3B is a longitudinal cutaway view of finished double wall corrugated paperboard including a reinforcing liner.

FIGS. 3A and 3B illustrate the prior art and the invention, respectively, and are longitudinal cutaway views of finished double wall corrugated paperboard.

Figure 4:
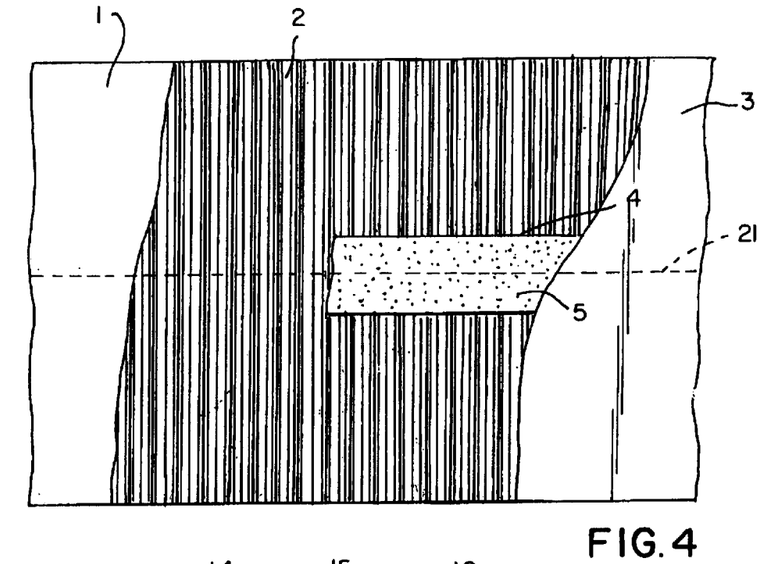
FIG. 4 is a layered top view of a finished sheet of reinforced single wall corrugated paperboard showing each component layer.
Figure 7A:
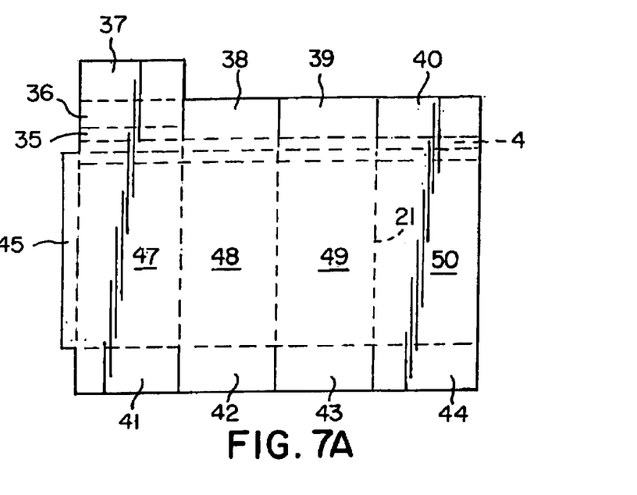
FIG. 7A is a top view of a scored and cut blank prior to being folded and glued to form a regular slotted container with basiloid flap.
Figure 7B:
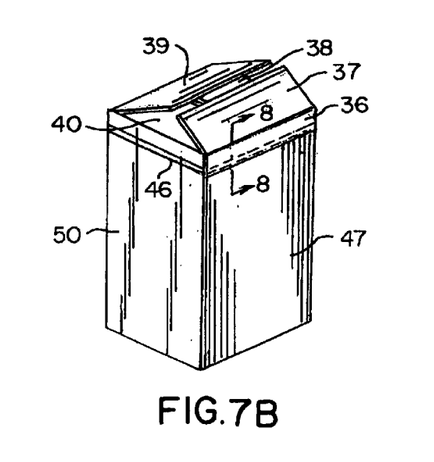
FIG. 7B is a perspective view of a regular slotted style container with basiloid flap.

FIG. 4 shows a finished piece of combined board separated to show each individual component including singleface liner 1, corrugating medium 2, doubleface liner 3, reinforcing liner 4, and heat activated adhesive 5. FIGS. 7A and 7B further illustrate a feature of the preferred embodiment of subject invention wherein reinforcing liner 4 is located about a scoreline 21. As previously noted, the lateral position(s) and width(s) of reinforcing liner(s) 4 are adjustable.

Figure 5:
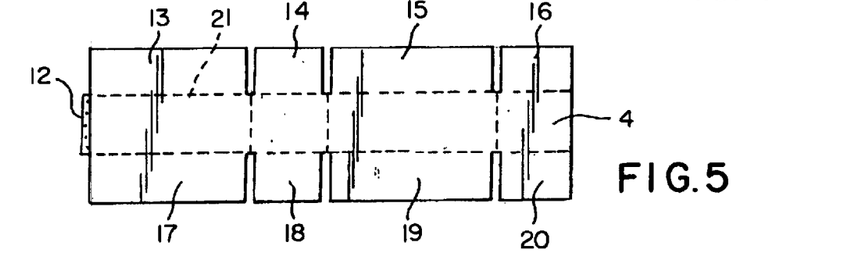
FIG. 5 is a top view of a scored and cut blank prior to being folded and glued to form a regular slotted style corrugated container.

FIG. 5 shows a preferred embodiment of the subject invention, wherein a blank for a regular slotted style container includes a reinforcing liner 4 as represented by the hatched area, a glue tab 12 and top and bottom flaps 13–20. Score lines are indicated by dashed lines 21. Reinforcing liner 4 is disposed between doubleface liner 3 and corrugating medium 2. In the embodiment show in FIG. 5, the width of reinforcing liner 4 spans the entire height of the walls of a regular slotted container, thus providing increased overall stacking strength as well as increased burst resistance throughout each vertical wall, without needlessly adding fiber and costs to the top and bottom flaps.

Figure 6A:
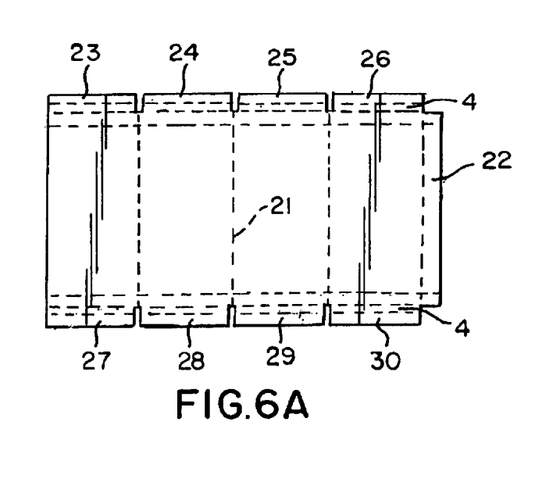
FIG. 6A is a top view of the scored and cut blanks which make up an interlocking double cover style corrugated container.
Figure 6B:
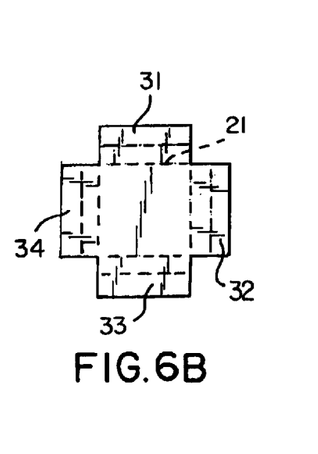
FIG. 6B shows the blanks prior to being folded, glue, stapled and generally erected.

FIG. 6A shows a blank for the body including glue tab 22, locking flaps 23–30 and scorelines indicated by dashed lines 21, and typical blank for the top and bottom covers including scorelines 21 and closure flaps 31–34. Importantly, the body blank shown in FIG. 6A includes reinforcing liners 4 located across the top and bottom horizontal scorelines 21. FIGS. 6A and 6B illustrate a preferred embodiment of the subject invention wherein reinforcing liner 4 is located about the top and bottom horizontal scorelines 21 to add strength to each closure flap area. Interlocking double cover style containers are often used to contain heavy appliances and are normally moved about by clamp trucks that clamp only the joint areas. Thus, placing the reinforced strips in these selective areas provide the package with enhanced tear and strength properties.

Figure 8:
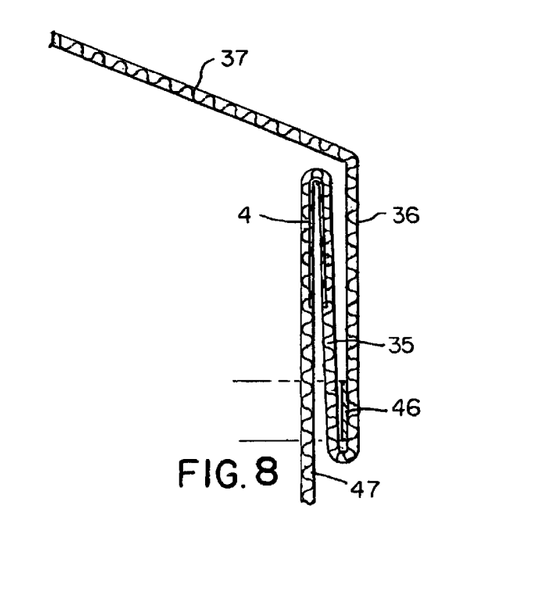
FIG. 8 is a longitudinal cutaway view showing the detail of the basiloid flap.

FIG. 7B illustrates a regular slotted container with basiloid flap. FIG. 7A shows a top view of a blank including glue tab 45, side walls 47–50, top flaps 37–40, bottom flaps 41–44, scorelines 21, reinforcing liner represented by hatched area 4, and basiloid flap walls 35 and 36. As indicated by FIG. 8, upon folding and gluing, walls 35 and 36 form a horizontal flap substantially parallel to sidewall 47. Steel band 46 is placed tightly about the upper perimeter of the container and is situated around sidewalls 47–50, around basiloid flap wall 35, and between flaps 35 and 36. The basiloid flap structure enables lifting and moving of the container by a mechanism that includes a flat plate-like member inserted between sidewall 47 and flap wall 35. In this embodiment, reinforcing liner 4 is positioned to reinforce the scoreline between flap walls 35 and sidewall 47 to prevent failure during lifting and moving.

Figure 9:
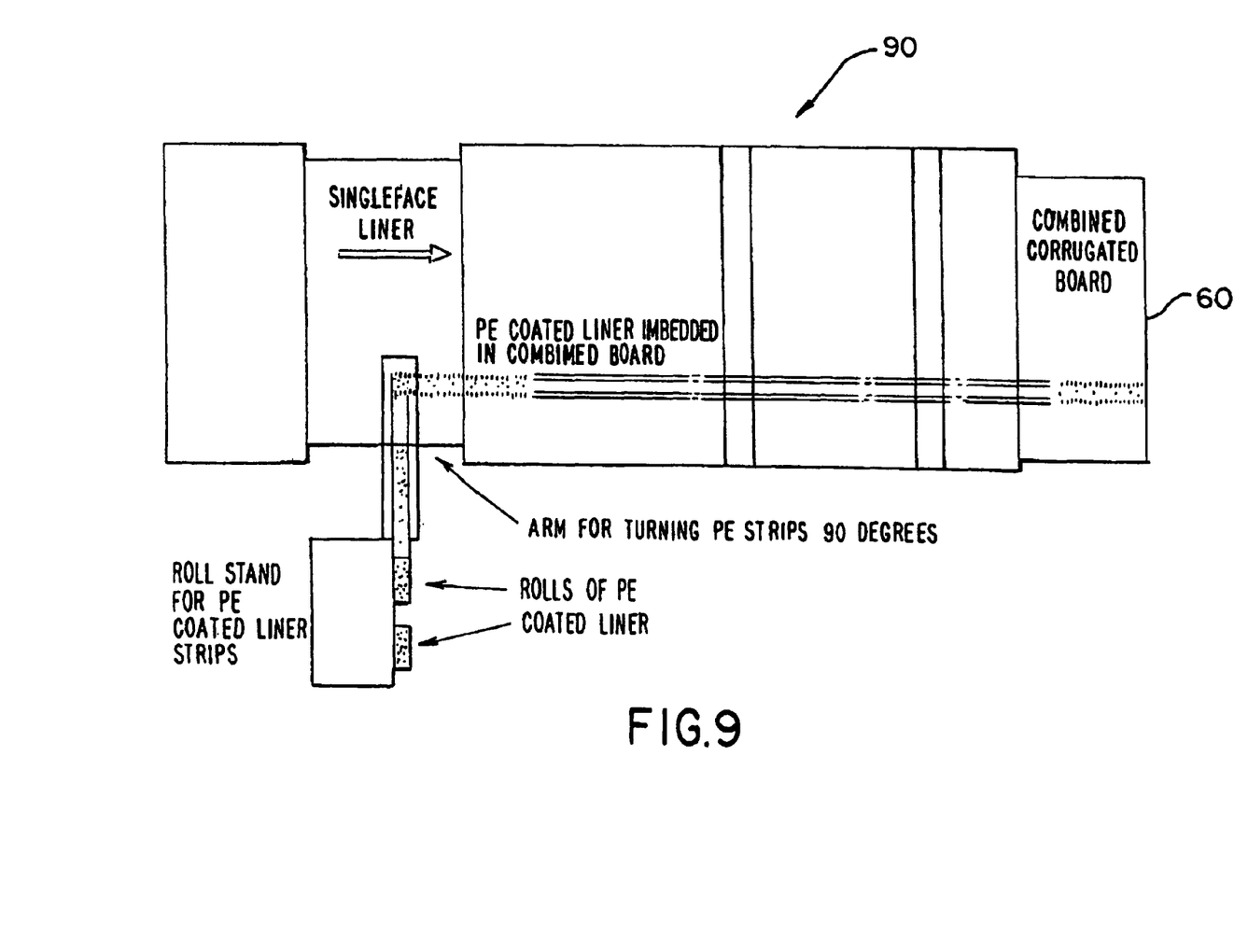
FIG. 9 is a diagram illustrating how the reinforcing strip is introduced on the corrugator (overhead view)
Figure 10:
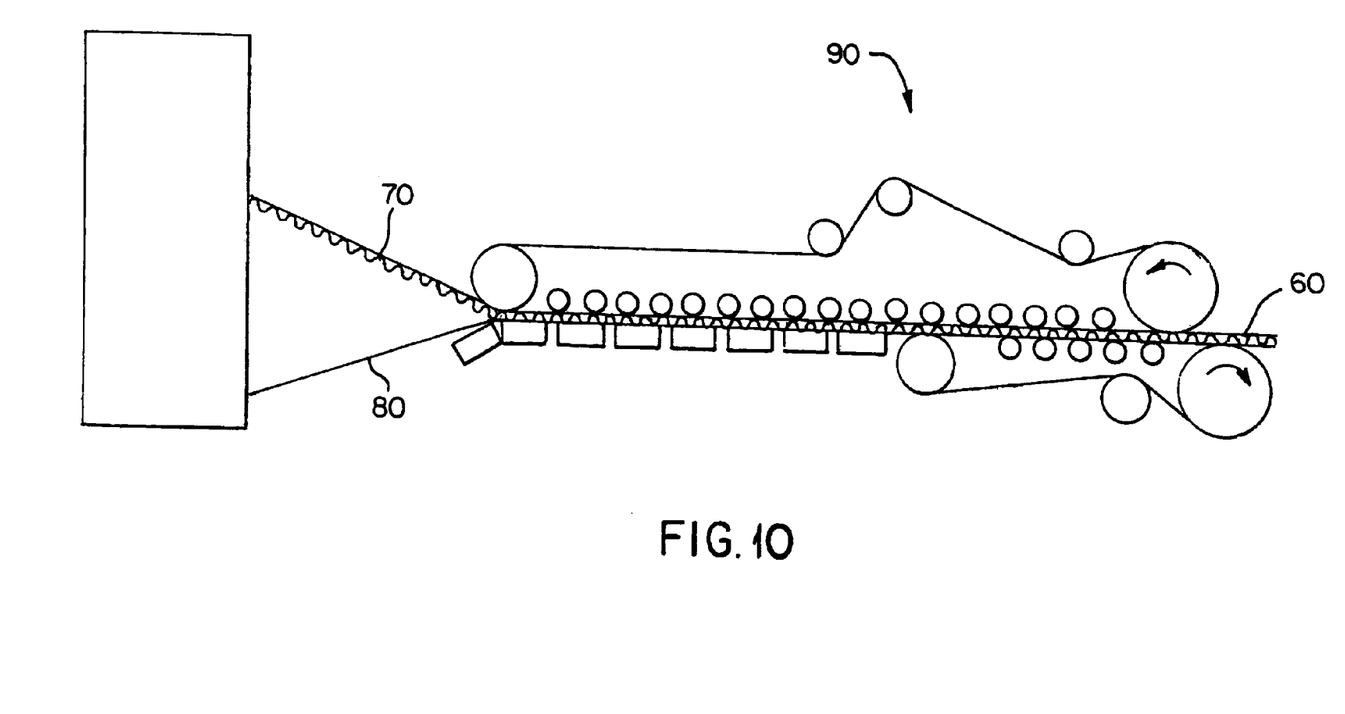
FIG. 10 is a diagram illustrating how the reinforcing strip is introduced on the corrugator (side view)

The process and apparatus for making the reinforcing strips for corrugated paperboard packaging are shown in FIGS. 9 and 10. In particular, FIGS. 9 and 10 illustrate the present process, where rolls of linerboard are coated on one side with a heat activated adhesive, preferably, a low melt point, low density adhesive polyethylene resin strip, slit to size and rewound into smaller rolls. These rolls of pre-coated reinforcing liner are mounted on a roll stand with a feeder mechanism. The roll stand/feeder mechanism feeds the strips into the corrugator just after the doublebacker and immediately before the hot plate section.

The roll stand holds two rolls of the polyethylene coated paper at one time and permits splicing from one roll to another. The roll stand contains hoists to lift the polyethylene coated rolls into place and has a pneumatic breaking system to control unwinding speed. The roll stand is portable which allows it to be moved out of the way when not in use and the extending feeding mechanism enables it to be set up perpendicular to the corrugator.

In a preferred embodiment, the polyethylene coated strip is placed so that it reinforces the score on the corrugated board that eventually forms the joint at the top of the box. The polyethylene coated strip is placed on the inside of the combined corrugated board, between the corrugating medium and doubleface liner (also referred to as a doubleback liner). As stated above, the roll stand/feeder mechanism feeds the strips into the corrugator just after the doublebacker and immediately before the hot plate section. The heat from the hot plate section of the apparatus melts the polyethylene causing the polyethylene coated liner to bond with the doubleface liner. A starch-based adhesive applied to the flute tips of the corrugating medium in the doubleface liner bonds the polyethylene coated strip to the corrugating medium.

The size of the strip used can be varied depending on the application, from narrow widths that reinforce small areas of the container to larger strips that can reinforce entire panels.

In a preferred embodiment of the invention, six-inch wide strips are used.

As shown in FIG. 10, the polyethylene coated liner 60 is feed from the roll stand feeder mechanism to the corrugator between a continuous web of single faced liner with medium 70, and double back liner 80. The roll stand/feeder mechanism feeds the strips into the corrugator just after the doublebacker and immediately before the hot plate section. The heat from the hot plate section of the apparatus (collectively 90) melts the polyethylene causing the coated liner to bond with the doubleface liner.

The present invention described herein by referring to drawings of examples of how the invention can be made and used. In these drawings, reference characters are used throughout the views to indicate like or corresponding parts. The embodiments shown and described herein are exemplary. Many details are well known in the art, and as such are neither shown nor described. Even though numerous characteristics and advantages of the present invention have been described in the drawings and accompanying text, the description is illustrative only, and modifications may be made in the detail, especially in matters of shape, size, and arrangement of the parts, within the principles of the inventions, to the full extent indicated by the broad general meaning of the terms used in the attached claims.

The invention now being fully described, it will be apparent to one of ordinary skill in the art that many changes and modifications can be made thereto without departing from the spirit or scope of the invention as set forth herein.

What is claimed is:

1. A reinforced corrugated paperboard substrate, comprising:
    a top paperboard liner having at least one top scoreline extending across at least a portion of said top paperboard liner;
    a bottom paperboard liner having at least one bottom scoreline extending adjacent said top scoreline across at least a portion of said bottom paperboard liner;
    a fluted paperboard medium positioned between said top paperboard liner and said bottom paperboard liner;
    a reinforcing liner positioned between said medium and said bottom paperboard liner, said reinforcing liner extending over at least a portion of said bottom scoreline; and
    an adhesive for adhering said reinforcing liner to said bottom paperboard liner.

2. The reinforced corrugated paperboard substrate according to claim 1, wherein said adhesive is a heat activated compound activated by ambient heat.

3. The reinforced corrugated paperboard substrate according to claim 2, wherein said heat activated adhesive is a thermoplastic material with a melting paint below 250° F.

4. The reinforced corrugated paperboard substrate according to claim 3, wherein said thermoplastic material is a low-density polyethylene resin.

5. The reinforced corrugated paperboard substrate according to claim 4, wherein said low-density polyethylene resin has a coating weight in the range of 5.0–20.0 lbs./3000 sq. ft.

6. The reinforced corrugated paperboard substrate according to claim 4, wherein said low-density polyethylene resin has a density in the range of 0.90–1.00 g./cm$_3$.

7. The reinforced corrugated paperboard substrate according to claim 2, wherein said heat-activated adhesive is a thermosetting material with a melting point below 250° F.

8. The reinforced corrugated paperboard substrate according to claim 1, wherein a top surface of said medium is adhered to a bottom surface of said top paperboard liner, and wherein at least a portion of a bottom surface of said medium is adhered to at least a portion of a top surface of said bottom paperboard liner.

9. The reinforced corrugated paperboard substrate according to claim 1, wherein said reinforcing liner has a width that is less than a width of said medium.

10. The reinforced corrugated paperboard substrate according to claim 1, wherein a top surface of said reinforcing liner is adhered to a bottom surface of said medium.

11. The reinforced corrugated paperboard substrate according to claim 1, wherein said top scoreline is a foldline.

* * * * *